United States Patent Office 2,839,527
Patented June 17, 1958

2,839,527

SULFANILAMIDO ISOXAZOLE DERIVATIVES

Marc Cole, Bayonne, N. J., assignor to Hoffmann-La Roche Inc., Nutley, N. J., a corporation of New Jersey No Drawing. Application September 14, 1956
Serial No. 609,818

7 Claims. (Cl. 260—239.9)

This invention relates to $N^1$-carbonyl derivatives of 3,4-dimethyl-5-sulfanilamido isoxazole. More particularly, the invention relates to $N^1$-carbonyl derivatives of 3,4-dimethyl-5-sulfanilamido isoxazole, wherein the $N^1$-atom bears a carbalkoxy, carbaralkoxy or carbocycloalkoxy group.

The carbalkoxy groups which are attached to the $N^1$-atom are preferably carbo lower alkoxy groups such as carbomethoxy, carbethoxy, carbopropoxy, etc., but higher carbalkoxy groups up to about 12 carbon atoms may also be used, e. g., carboctyloxy. The alkyl portion of the carbalkoxy groups may be either straight or branched chain. Carbaralkoxy groups include carbobenzyloxy, carbophenethoxy, and the like. Carbocycloalkoxy groups are those wherein a saturated cycloaliphatic group, preferably cycloaliphatic groups containing 5 to 6 carbon atoms such as cyclopentyl or cyclohexyl, form part of the $N^1$-substituent radical. A preferred group of compounds of this invention comprises $N^1$-carbonyl derivatives of 3,4-dimethyl-5-sulfanilamido isoxazole wherein the $N^1$-atom bears a carbo lower alkoxy group, carbobenzyloxy group or carbocyclohexyloxy group.

The compounds of this invention are useful as antibacterial agents, being effective against gram-positive and gram-negative organisms such as Streptococci and Salmonella. The compounds are tasteless and may be administered orally in therapeutic doses in conventional forms, such as tablets, suspensions, and the like.

The $N^1$-carbonyl derivatives of 3,4-dimethyl-5-sulfanilamido isoxazole may be produced by reacting a metal salt, e. g., a heavy metal salt such as the lead or silver salt, of 3,4-dimethyl-5-sulfanilamido isoxazole with a halocarbonate containing the desired substituent, e. g. alkyl halocarbonates such as methyl chlorocarbonate and ethyl chlorocarbonate, aralkyl halocarbonates such as benzyl chlorocarbonate, and cycloalkyl halocarbonates such as cyclohexyl chlorocarbonate, etc. The reaction is preferably effected in an organic solvent such as acetone, benzene, toluene, xylene or other hydrocarbon solvents in the presence of pyridine as a catalyst. Approximately equimolecular proportions of the monovalent metal salt of 3,4-methyl-5-sulfanilamido isoxazole and the halocarbonate compound are used. In the case of divalent metal salt, approximately two molecular proportions of the halocarbonate compound per mol of the divalent metal salt are required. The halocarbonates may be produced, for example, by reacting phosgene with the appropriate alcohol at a low temperature.

The following examples are illustrative of the present invention:

Example 1

80.1 g. of 3,4-dimethyl-5-sulfanilamido isoxazole were added to 800 cc. of water containing 8 g. of ammonia and to the resulting clear solution were added 51 g. of silver nitrate in 510 cc. of water slowly with stirring. The $N^1$-silver salt of 3,4-dimethyl-5-sulfanilamido isoxazole precipitated and was filtered off and washed neutral with water, then dried at 50° C.

37.4 g. of dry, finely ground $N^1$-silver salt of 3,4-dimethyl-5-sulfanilamido isoxazole were stirred with 100 cc. of acetone and 10 cc. pyridine. To the suspension thus formed were slowly added 10.8 g. of ethyl chlorocarbonate. The temperature rose to about 35° C. to 40° C. Stirring was continued for one hour after all the carbonate was added. Then a solution of 50 g. of sodium thiosulfate in 360 cc. of water containing 3.6 g. of ammonia was added. $N^1$-carbethoxy-3,4-dimethyl-5-sulfanilamido isoxazole crystallized out and was filtered off. The crystalline material was washed twice, each time with 30 cc. of ethyl alcohol, and then dried at 50° C. 22 g. of the white powder, $N^1$-carbethoxy-3,4-dimethyl-5-sulfanilamido isoxazole, were warmed to 60° C. with 88 g. of glacial acetic acid. The clear solution was stirred with 5 g. of charcoal and the mass was then filtered through a heated funnel. Crystals formed on cooling. The mass was cooled to 12° C., filtered, and crystals were washed first with glacial acetic acid and then with methanol. The $N^1$-carbethoxy-3,4-dimethyl-5-sulfanilamido isoxazole was dried at 50° C. to constant weight, M. P. 140.5° C. (uncorrected).

Example 2

18.9 g. of methyl chlorocarbonate were added slowly over one-half hour with stirring to 112 g. of the $N^1$-silver salt of 3,4-dimethyl-5-sulfanilamido isoxazole suspended in 634 cc. of acetone and 29 cc. of pyridine. The temperature during the addition was held at 20° C. The mixture was then stirred for one hour at 20° C. and the silver chloride which had formed was filtered off. The filtrate was poured with stirring into two liters of 1% aqueous ammonia at 0° to 5° C. and stirred for 10 minutes. $N^1$-carbomethoxy-3,4-dimethyl-5-sulfanilamido isoxazole precipitated. It was filtered off, washed with ice water until free of ammonia and then washed with 100 cc. of methanol at −10° C. The cake was dried in vacuo at room temperature.

The crude product thus obtained was added to 3 parts by volume of glacial acetic acid, heated to 90° C., then cooled to 17° C. with stirring. The product was then filtered, washed with 50 cc. of glacial acetic acid at 17° C. and then with 50 cc. of methanol at 0° C. It was then dried in vacuo at room temperature. The $N^1$-carbomethoxy-3,4-dimethyl-5-sulfanilamido isoxazole thus obtained was in the form of colorless crystals melting at 168° to 170° C.

Example 3

Octyl chlorocarbonate was prepared by bubbling slowly 99 g. of phosgene gas into 130 g. of octyl alcohol at 0° to 5° C. and stirring for one hour. The crude octyl chlorocarbonate was washed 4 times with 130 cc. of ice water each time, after which 5 g. of calcium chloride were added. After stirring for 15 minutes, the octyl chlorocarbonate thus obtained was filtered off. The product is a dry, neutral oil.

97 g. of the $N^1$-silver salt of 3,4-dimethyl-5-sulfanilamido isoxazole were suspended in 500 cc. of dry acetone and 25 cc. of dry pyridine. To this suspension were added slowly with stirring over the course of one hour, 45 g. of octyl chlorocarbonate at a temperature of 20°–25° C. The mixture was stirred overnight at room temperature. The silver chloride which had formed was filtered off and washed with 50 cc. of acetone.

The crude product, $N^1$-carboctyloxy-3,4-dimethyl-5-sulfanilamido isoxazole, was isolated in the same manner as described in Example 2. The dried crude cake obtained was recrystallized from 200 cc. of methanol. The crystalline N¹-carboctyloxy-3,4-dimethyl-5-sulfanilamido isoxazole thus obtained melted at 118°–119° C.

*Example 4*

Benzyl chlorocarbonate was produced by adding 198 g. of phosgene slowly to 216 g. of benzyl alcohol with stirring at 0° to 5° C. The resulting liquid was washed several times with ice water, dried and neutralized with calcium carbonate and calcium chloride and then filtered.

150 g. of the N¹-silver salt of 3,4-dimethyl-5-sulfanilamido isoxazole were suspended in 500 cc. of dry acetone and 40 cc. of dry pyridine. To this suspension were added slowly with stirring 60 g. of benzyl chlorocarbonate, holding the temperature during the addition to 15° to 20° C. The reaction mixture was stirred overnight at 20° C. The mixture was then filtered to remove the silver chloride and the cake was washed thoroughly with acetone. The pale yellow filtrate was then distilled at 20° C. under vacuum to remove all of the solvent. The oily residue was added to 2 liters of 1% ice-cold ammonia with agitation. The crude N¹-benzyloxy-3,4-dimethyl-5-sulfanilamido isoxazole separated as a whitish-yellow gum. The viscous material was agitated in the ammonia solution and washed several times with ice-water, then dried.

To the gum was added 300 cc. of methanol and the mixture was heated to boiling on a water-bath. The mixture was then slowly cooled to 20° C. The mixture was filtered cold, and the cake was washed with 225 cc. of methanol at −20° C. and then dried on a filter at room temperature.

The crude N¹-benzyloxy-3,4-dimethyl-5-sulfanilamido isoxazole thus obtained was purified by dissolving it in methanol and heating to 60° C. for 15 minutes with stirring. The mixture was filtered and the product was permitted to crystallize from the filtrate at 20° C. The colorless crystalline N¹-benzyloxy-3,4-dimethyl-5-sulfanilamido isoxazole was washed with a little methanol at −20° C. and dried overnight over sulfuric acid at room temperature under vacuum M. P. 130–131° C.

*Example 5*

198 g. of phosgene were bubbled slowly into a solution of 200 g. of cyclohexanol in 200 cc. of acetone at −5° to 0° C. with stirring. The solution was stirred for an additional hour, then the acetone was distilled off under vacuum at about 20°–25° C. The residue was washed twice with 150 cc. of cold water. The liquid cyclohexyl chlorocarbonate was then dried with 10 g. of calcium chloride and made neutral to Congo red paper with calcium carbonate.

38 g. of cyclohexyl chlorocarbonate were dropped over the course of an hour with mixing into a suspension of 100 g. of the N¹-silver salt of 3,4 - dimethyl - 5 - sulfanilamido isoxazole in 500 cc. of dry acetone and 25 cc. of dry pyridine. The suspension was stirred overnight at 20°–25° C. The silver chloride which had formed was filtered off and the acetone was then distilled off at 20° C. under vacuum.

The oily liquid residue was mixed into two liters of 1% ice-cold ammonia with agitation. Crude N¹-carbocyclohexyloxy - 3,4 - dimethyl - 5 - sulfanilamido isoxazole separated as a whitish-yellow mass. This mass was washed with ammonia and the ammonia was then removed as described in Example 4. Upon washing with ammonia, the gum whitened and finally became hard and crystalline.

The crystals thus obtained were filtered off, washed with 150 cc. of methanol at −50° C. and dried at room temperature. The dry crystals were then dissolved in methanol, stirred near the boiling point for about 10 minutes and filtered while hot. The filtrate was cooled slowly to 0° C. with stirring and held at that temperature for 10 minutes. The crystalline N¹-carbocyclohexyloxy-3,4-dimethyl-5- sulfanilamido isoxazole which formed was washed with methanol at −10° C. and dried at room temperature, M. P. 127° to 128° C.

*Example 6*

80.1 g. of 3,4-dimethyl-5-sulfanilamido isoxazole were suspended in 800 cc. of water and to this was added a solution of 87.6 g. of lead subacetate in 870 cc. of water. The pH of the resulting mixture was 5.6. The mixture was stirred overnight. The suspension was filtered and the filter cake was washed with about 10 liters of water.

The cake was suspended in one liter of 1% ammonia solution at 0°–5° C. and stirred thoroughly for two minutes. The mass was filtered and washed with ice-water until the filtrate was free of ammonia. The resulting cake was washed with 50 cc. of acetone and dried overnight at room temperature. The dry material was ground up to pass through a 60 mesh screen. The N¹-lead salt of 3,4-dimethyl-5-sulfanilamido isoxazole melted at 232° to 234° C., with decomposition.

61.6 g. of the lead salt obtained above were suspended in 500 cc. of acetone and 29 cc. of pyridine were added to the suspension. The suspension was stirred and to it was added a solution of 14.5 g. of ethyl chlorocarbonate in 72 cc. of acetone over a period of 5½ hours at 20° C. After the addition was complete, the mass was filtered and the filtrate was mixed with 8 liters of 1% ice-cold ammonia. N¹ - carbethoxy - 3,4-dimethyl-5-sulfanilamido isoxazole crystallized out. The crystals were filtered off, washed free of ammonia with ice-water, washed with 20 cc. of ice-cold methanol and dried at room temperature. The N¹-carbethoxy - 3,4 - dimethyl-5-sulfanilamido isoxazole melted at 142°–142.5° C.

I claim:

1. N¹-carbonyl derivatives of 3,4-dimethyl-5-sulfanilamido isoxazole wherein the substituent group on the N¹-atom is a member of the group consisting of carbalkoxy groups having up to 12 carbon atoms, carbaralkoxy groups having 8 to 9 carbon atoms, and carbocycloalkoxy groups having 6 to 7 carbon atoms.

2. N¹-carbo lower alkoxy-3,4-dimethyl-5-sulfanilamido isoxazole.

3. N¹ - carbomethoxy - 3,4 - dimethyl - 5 - sulfanilamido isoxazole.

4. N¹ - carbethoxy - 3,4 - dimethyl - 5 - sulfanilamido isoxazole.

5. N¹ - carbobenzyloxy - 3,4 - dimethyl - 5 - sulfanilamido isoxazole.

6. N¹ - carboctyloxy - 3,4 - dimethyl - 5 - sulfanilamido isoxazole.

7. N¹ - carbocyclohexyloxy - 3,4 - dimethyl - 5 - sulfanilamido isoxazole.

References Cited in the file of this patent
UNITED STATES PATENTS

| | | |
|---|---|---|
| 2,332,906 | Foldi et al. | Oct. 26, 1943 |
| 2,721,200 | Hoffer | Oct. 18, 1955 |